(12) United States Patent
Neitzel

(10) Patent No.: US 7,670,560 B2
(45) Date of Patent: Mar. 2, 2010

(54) DROPLET TRANSPORT SYSTEM AND METHODS

(75) Inventor: G. Paul Neitzel, Sandy Springs, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 911 days.

(21) Appl. No.: 11/414,824

(22) Filed: May 1, 2006

(65) Prior Publication Data

US 2006/0246224 A1 Nov. 2, 2006

Related U.S. Application Data

(60) Provisional application No. 60/676,031, filed on Apr. 29, 2005.

(51) Int. Cl.
 *B01L 3/02* (2006.01)
(52) U.S. Cl. ...................................... 422/100
(58) Field of Classification Search .................. 422/100
 See application file for complete search history.

(56) References Cited

U.S. PATENT DOCUMENTS

| | | | |
|---|---|---|---|
| 4,896,849 A * | 1/1990 | Moynihan ................. | 244/173.1 |
| 5,046,854 A * | 9/1991 | Weller et al. ................. | 356/440 |
| 5,587,128 A * | 12/1996 | Wilding et al. ................. | 422/50 |
| 6,294,063 B1 * | 9/2001 | Becker et al. ............... | 204/450 |

OTHER PUBLICATIONS

Alvin, J.; Tanger, C.; Wei, J.; Tzeng, Y. "Diamond-Coated Quartz and Sapphire Optical Windows." Diamond Films and Technology, 1995, vol. 5, No. 2, pp. 87-93.*

H.A. Stone, et al., 2004 Engineering Flows in Small Devices: Microfluidics Toward a Lab-on-a-Chip. Annual Review of Fluid Mechanics pp. 381-411.

Benitendi, S.W. & Smith, M.K. 1999, The Spreading of a Non-Isothermal Liquid Droplet. Physics of Fluids 11, p. 982.

Benz, S., Hintz, P., Riley, R.J. & Neitzel, G.P. 1998, Instability of Thermocapillary Buoyancy Convection in Shallow Layers. Part 2. Suppression of hydrothermal waves. Journal of Fluid Mechanics 359, p. 165.

Brochard, F. 1989, Motions of Droplets on Solid Surfaces Induced by Chemical or Thermal Gradients. Langmuir 5, p. 432.

Brzoska, J.B., Brochard-Wyart, F. & Rondelez, F. 1993, Motion of Droplets on Hydrophobic Model Surfaces Induced by Thermal Gradients. Langmuir 9, p. 2220.

Chen, J.-C., Kuo, C.-W. & Neitzel, G.P. 2006, Numerical Simulation of Thermocapillary Nonwetting. International Journal of Heat and Mass Transfer to appear.

Darhuber, A.A., Davis, J.M. & Troian, S.M. 2003 Thermocapillary Actuation of Liquid Flow on Chemically Patterned Surfaces. Physics of Fluids 15, p. 1295.

(Continued)

*Primary Examiner*—Walter D Griffin
*Assistant Examiner*—Bobby Ramdhanie
(74) *Attorney, Agent, or Firm*—Thomas, Kayden, Horstemeyer & Risley, LLP.

(57) ABSTRACT

Embodiments of droplet transport systems and methods are disclosed for levitating and transporting single or encapsulated droplets using thermocapillary convection. One method embodiment, among others comprises providing a droplet of a first liquid; and applying thermocapillary convection to the droplet to levitate and move the droplet.

22 Claims, 7 Drawing Sheets

OTHER PUBLICATIONS

Darhuber, A.A., Valentino, J.P., Troian, S.M. & Wagner, A. 2003, Thermocapillary Actuation of Droplets on Chemically Patterned Surfaces by Programmable Microheater arrays. Journal of Microelectromechanical Systems 12, p. 873.

Dell'Aversana, P. & Neitzel, G. P., 2004 Behavior of Noncoalescing and Nonwetting Drops in Stable and Marginally Stable States. Expts. Fluids 36, p. 299.

Ford, M. L. & Nadim, A. 1994, Thermocapillary Migradion of an Attached Drop on a Solid Surface. Physics of Fluids 6, p. 3183.

Kuo, C.-W., Chen, J.-C. & Neitzel, G. P. 2006, Numerical Simulation of Isothermal Nonwetting. Submitted for publication.

Neitzel, G. P., & Dell'Aversana, P. 2002, Noncoalescence and Nonwetting Behavior of Liquids. Annual Review of Fluid Mechanics 34, p. 267.

Riley, R.J. & Neitzel, G.P. 1998, Instability of Thermocapillary-Buoyancy Convection in Shallow Layers. Part I. Characterization of Stead and Oscillary Instabilities. Journal of Fluid Mechanics 359, p. 143.

Sammarco, T.S. & Burns, M.A. 1999, Thermocapillary Pumping of Discrete Droplets in Microfabricated Analysis Devices. AIChE Journal 45, p. 350.

Savino, R. & Monti, R. 1997, Modeling of Non-coalescing Liquid Drops in the Presence of Thermocapillary Convection. Meccanica 32, p. 115.

Smith, M.K. 1995, Thermocapillary Migration of a Two-dimensional Droplet on a Solid Surface. Journal of Fluid Mechanics 294, p. 209.

Sumner, L.B.S., Wood, A.M. & Neitzel, G.P. 2003, Lubrication Analysis of Thermocapillary-induced Nonwetting. Physics of Fluids 15, p. 2923.

Van Den Doel, L.R., Nagy, P.T., Van Vliet, L.J. & Neitzel, P. 2005, Regularaized Phase Tracker with Isophase Scanning Strategy for Analysis of Dynamic Interferograms of Nonwetting Droplets under Excitation. Applied Optics 44, p. 2695.

Ganan-Calvo A.M., Gordillo J.M. 2001, Perfectly Monodisperse Microbubbling by Capillary Flow Focusing, published 2001.

Juncker D., Schmid H., Drechsler Wolf H., Michel B., et al., 2002. Microfludic Capillary Systems for the Autonomous Transport of Bio/Chemicals. Micro Total Analysis Systems 2002, ed. Y Baba, S. Shoji, A. Van Den Berg, 2: p. 951-54.

Kenis PJA, Ismagilov RF, Whitesides GM. 1999. Microfabrication Inside Capillaries Using Multiphase Laminar Flow Patterning. Science 285: p. 83-85.

Mazouchi A., Homsy GM. 2001. Thermocapillary Migration of Long Bubbles in Polygonal Tubes. I. Theory Phys. Fluids 13: p. 1594-1600.

Pollack MG, Fair RB, Shenderov AD. 2000. Electrowetting-based Actuation of Liquid Droplets for Microfluidic Applications. Appl. Phys. Lett. 77: p. 1725-26.

* cited by examiner

DROPLET TRANSPORT SYSTEM AND METHODS

CROSS-REFERENCE TO RELATED APPLICATION

This application claims priority to U.S. provisional application entitled, "Novel Droplet Transport System," having Ser. No. 60/676,031, filed Apr. 29, 2005, which is entirely incorporated herein by reference.

STATEMENT REGARDING FEDERALLY SPONSORED RESEARCH OR DEVELOPMENT

This invention was made with the U.S. Government support under agreement number NAG3-2431 awarded by the National Aeronautics and Space Administration (NASA). The Government has certain rights in this invention.

TECHNICAL FIELD

The present disclosure is generally related to liquids and, more particularly, is related to systems and methods for transporting liquids.

BACKGROUND

The coalescence of two masses of the same liquid is a phenomenon of common occurrence to processes as diverse as a formation of raindrops, droplet combustion, separation of emulsions, and spray painting. Equally, but perhaps less often noticed, are examples wherein two liquid bodies that would normally be expected to unite (because they are either miscible or even the same liquid) do not, if only temporarily. For instance, splashing water in a container or on a lake when paddling a canoe often results in droplets that float on the surface for as much as several seconds before combining with the bulk liquid. Hot coffee dripping from a drip-style coffee maker routinely produces droplets that appear to dance for a few moments on the surface of the coffee already in the pot.

A scattering of droplets emerging from a jet in a nearly vertically upward fashion from a nozzle may be due to the rebound of the drops when they come into collision with one another, because droplets inevitably come into contact with each other owing to the different velocities they posses as they break away as a result of capillary instability. Even when the breakup is made more regular through the imposition of vibration, the lateral expansion of a continuous jet necessary to satisfy continuity is not possible with individual droplets, which, therefore, must come into contact. The effect of static electrical charge on both vertical jet breakup and collisions of horizontal jets has also been investigated, with results indicating both attractive and repulsive effects.

Recently, bioprocessing, such as DNA testing, on small semiconductor chip-level architectures has employed lab-on-a-chip (LOC) systems. LOC systems may use micro-machined channels or embedded electronics, for example, to move liquids from one position to another. One proposed method of moving liquids is to use a pressure pulse on a liquid in a channel to help it move along. Other methods of manipulating and mixing liquids include techniques that change the surface tension or that create surface-tension gradients or electric fields such as electro-osmosis and electro-phosphoresis; magnetic methods such as magnetohydrodynamics (MHD) stirring; rotational methods such as centrifugal forces; and acoustical methods such as acoustic streaming. Problems introduced with pipe or channel solutions include large pressure differences across a drop that are required to sustain volume flow rates due to the increase of frictional forces as the pipes or channels get smaller in cross-section. The increased friction slows down liquid transport, thus reducing device throughput. Also, with subsequent samples moving through channels and contacting channel walls, sample-to-sample contamination can be an issue.

SUMMARY

Embodiments of the present disclosure provide systems and methods for droplet transport.

Briefly described, in architecture, one embodiment of the system, among others, can be implemented as follows. A droplet transport system comprises a droplet of a first liquid; and a heat source applied to the droplet for levitating and moving the droplet.

Embodiments of the present disclosure can also be viewed as providing methods for transporting droplets. In this regard, one embodiment of such a method, among others, can be broadly summarized by the following steps: providing a droplet of a first liquid; and applying thermocapillary convection to the droplet to levitate and move the droplet.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A wealth of research has been performed on the phenomenon of coalescence. Whereas its counterpart, non-coalescence, has been studied for at least as long, non-coalescence has only recently experienced renewed interest due to demonstrations of permanent non-coalescence. The commonly observed temporary nature of non-coalescence is largely due to the finite time for interstitial fluid separating and lubricating liquid surfaces to drain from between them. Non-coalescence and non-wetting, either temporary or permanent, may result from the existence of a layer of an intervening substance (either a liquid or a gas) between two bodies, at least one of which is a liquid. The typical distances separating the non-coalescing or the non-wetting interfaces to be considered are micrometers. On such scales, under normal ambient conditions, gases as well as liquids may be modeled as continuous media. At smaller distances, other aspects of non-coalescence and non-wetting phenomenon become relevant.

Permanent non-coalescence and non-wetting are phenomena that are driven by a permanent presence of a lubricating film of gas separating either two masses of the same liquid, or a liquid and a solid that would normally be wetted by the liquid. This film, in turn, may be provided by the relative motion of the surfaces, which may be accomplished using thermocapillarity. Thermocapillarity is the variation of a liquid's surface tension with temperature. For instance, when a temperature difference exists along a liquid's free surface, variations of surface tension induced by the temperature difference cause motion of the surface and the adjacent bulk fluids, both liquid and gas.

Figure 1:
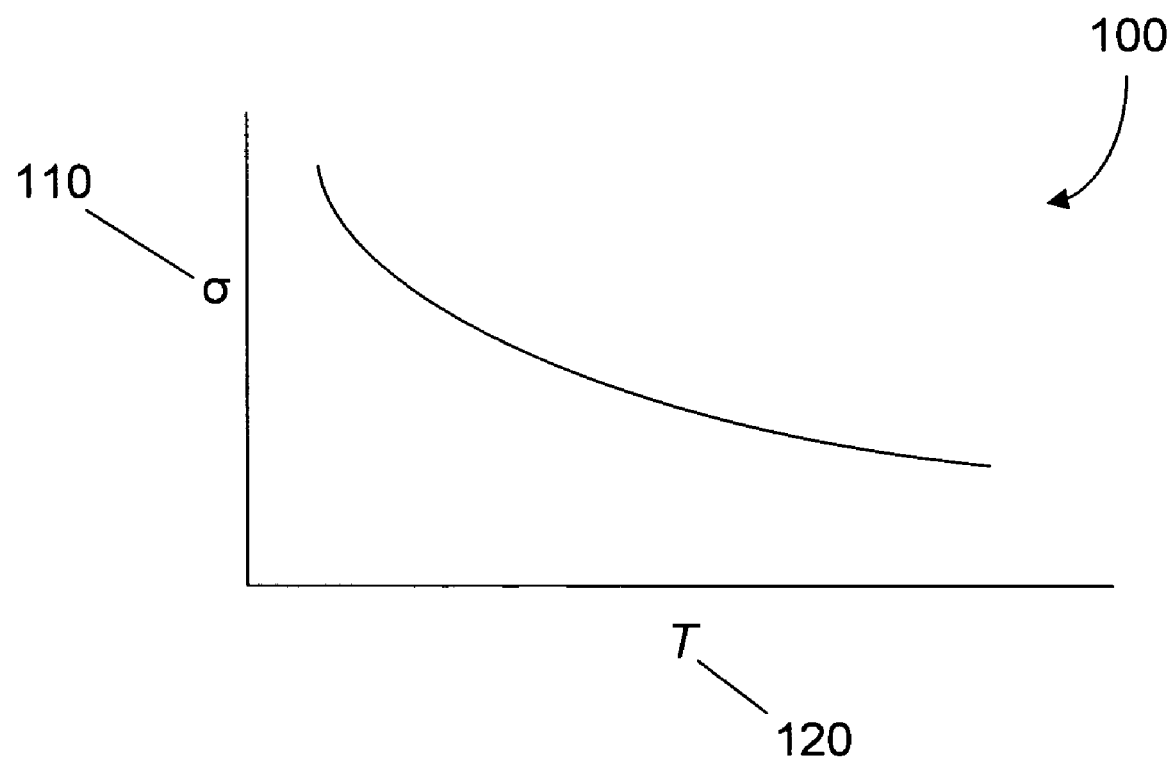
FIG. 1 is a graph of surface tension versus temperature for an exemplary embodiment of a liquid of interest.

Thermocapillarity is a variation of capillarity due to temperature changes. Referring to FIG. 1, a graph of surface tension a versus temperature T is shown. Thermocapillarity takes advantage of the inverse proportionality of σ and T for the liquids of interest here. Exemplary embodiments of liquids used in a lab-on-a-chip (LOC) and other potential droplet-transport schemes exhibit surface tension 110 that decreases as temperature 120 increases: the hotter the temperature 120, the lower surface the tension 110.

Figures 2A, 2B:
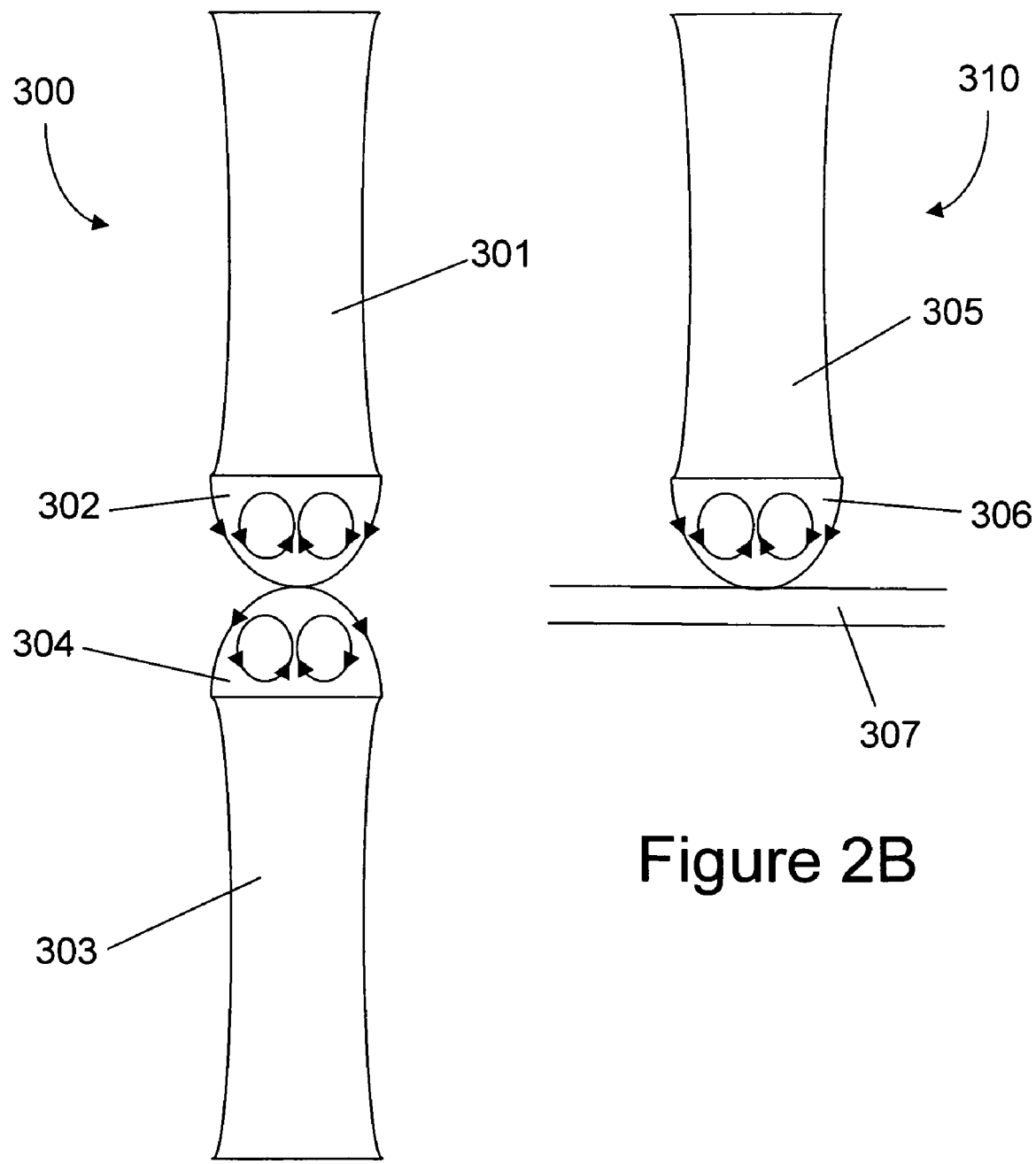
FIG. 2A is a side view of an exemplary embodiment of a droplet of the liquid of FIG. 1 on a metal rod abutting another droplet of the liquid of FIG. 1 on a metal rod.
FIG. 2B is a side view of an exemplary embodiment of a droplet of the liquid of FIG. 1 on a metal rod abutting a relatively cooler surface.

Non-coalescence and non-wetting driven by thermocapillarity are shown in FIGS. 2A and 2B, respectively, using droplets 302, 304, and 306 on the ends of metal rods 301, 303, 305, respectively. In both of these cases, upper liquid droplets 302, 306 are heated and lower liquid droplet 304 (non-coalescence) or solid surface 307 (non-wetting) is cooled. A free surface, the liquid-gas interface, moves toward the locally cooler center along hotter droplet 302, 306 under the action of thermocapillarity, dragging surrounding gas with it. Interferometry measurements provide that the gas forms a lubricating film several microns in thickness between the surfaces of droplets 302, 304 or the surfaces of liquid/solid 306, 307, preventing contact, and, thereby, coalescence or wetting, respectively. Thus, the two liquid droplets 302, 304 or the droplet and solid 306, 307 do not touch one another.

A stationary non-wetting droplet of the type shown in FIG. 2B has a vanishing coefficient of static friction, due to the axisymmetry of the flow fields in both the lubricating gas and droplet 306. Thus, zero force is required to initiate motion of a non-wetting droplet 306 along surface 307. Once motion is initiated, the symmetry is destroyed and the resultant droplet deformation requires that a force be applied to sustain such motion. Deformation-induced frictional forces are quite small. Measurements of exemplary isothermal non-wetting droplets indicate forces of ten micronewtons required for a moderately squeezed droplet of 20 cSt silicone oil to move at 100 centimeters per second.

Figure 3:
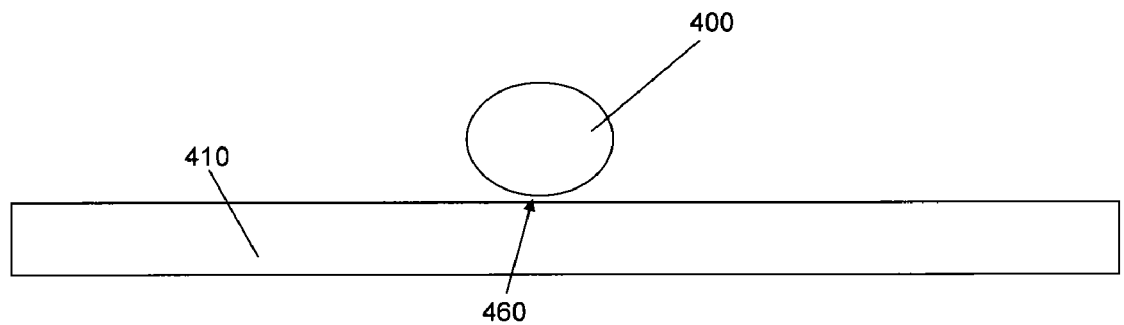
FIG. 3 is a side view of an exemplary embodiment of a droplet of the liquid of FIG. 1 levitated above a surface.

It is not necessary for a droplet to be attached to support 305 for the establishment of a lubricating film of gas between droplet and solid surface. The droplet may be heated remotely, in non-contact fashion, achieving non-wetting. In such a case, the droplet may actually be levitated above said solid surface. Such thermocapillary-levitated droplets may be used to advantage in LOC and other droplet-transport devices due to the low friction state and the levitating droplet capabilities. FIG. 3 shows a droplet of silicone oil 400 in a state of stationary levitation above a flat, cooled glass plate 410. Heating is provided from above using a $CO_2$ laser (not shown) or other infrared radiation sources emitting power in the infrared spectrum (for the $CO_2$ laser at a wavelength of 10.6 micrometers). Condensed liquid (a phenomenon more prominent when lower viscosity oils are used) is substantially absent from the surface of the plate 410, implying that minimal evaporation occurs.

Given a vanishing coefficient of static friction due to the symmetry of lubricating gas film, any deviation from a perfectly level surface might cause droplet 400 to slide away under the influence of its weight. However, although droplet 400 may move slightly due to the influence of transient air currents, droplet 400 may remain in place. This is due to the applied infrared-radiation (IR) beam diameter being larger than the diameter of droplet 400, coupled with the mechanism used to transport the levitated droplets from point to point. A pair of silicone oil droplets may be levitated with a single IR source by shifting the beam back and forth between the two droplets. These two droplets may also be brought into contact. Under appropriate conditions, the droplets may be made to coalesce with one another, mixing their contents.

For many LOC applications (e.g., DNA processing), the samples to be tested are aqueous based. Although water may be difficult to manipulate using thermocapillarity, aqueous samples may be encapsulated within droplets of immiscible oils. Inert, non-toxic silicone oils, as a non-limiting example, may be employed to create thermocapillary non-wetting environments. Whether one liquid will engulf or encapsulate another is dependent on the physical properties of the two liquids. Both silicone and mineral oils, among others, may be shown to encapsulate water, to permit the creation of compound droplets consisting of an inner phase of water (or other aqueous solution) and a surrounding phase of oil.

Figure 4:
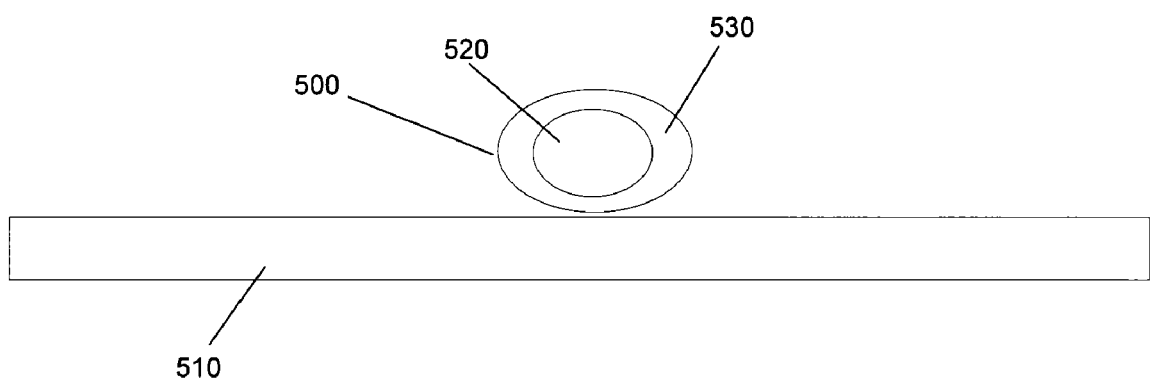
FIG. 4 is a side view of an exemplary embodiment of an encapsulated droplet of an aqueous solution within the liquid of FIG. 1 levitated above a surface.

Given the density mismatch between water and oil, an encapsulated water droplet may quickly migrate under the action of gravity to the bottom of an encapsulating oil droplet. FIG. 4 provides a compound droplet 500 comprising water droplet 520 encapsulated in oil 530, the compound droplet levitated above glass plate 510. A small encapsulated water droplet 520 may undergo vigorous translation, primarily in a meridional plane, due to a strong thermocapillary convection field induced in oil 530 through heating and cooling. As the overall volume of the compound-droplet decreases, however, as is especially the case in LOC applications, the effect of density mismatch (as determined through both static and dynamic Bond numbers) diminishes. The dynamic Bond number is proportional to the coefficient of volumetric thermal expansion and is inversely proportional to the surface tension/temperature coefficient. The dynamic Bond number plays a role in the competition between buoyancy and thermocapillarity and the determination of the power needed to both levitate and transport compound droplet 500.

The benefits obtained by oil encapsulation, in addition to permitting near frictionless thermocapillary transport of water droplets, are two-fold. First, concerning contamination, in liquid transport through a tube or along a surface, a leading sample leaves behind a thin film that comes into contact with a trailing sample. This may create a difficulty with respect to DNA testing, for example. Contamination of samples is a problem of great interest in LOC applications such as DNA processing. Sequentially pumping droplets containing different samples to be analyzed through a microchannel may leave behind liquid residue from the leading droplets that will contaminate the ones following it. Deposits may form at contact lines of evaporating droplets, giving rise to what is sometimes termed the "coffee spot effect." Thermocapillary-induced non-wetting may be employed to transport compound droplets from one point to another on the substrate with no liquid-solid contact, per se. Some evaporation from a droplet may occur and a thin film may form on a colder substrate due to subsequent condensation, but any liquid condensed on the surface will be the encapsulating oil and will not be the sample liquid. This evaporation and condensation may be minimized through the proper choices of less-volatile encapsulating oil and through the maintenance of minimal operating temperature differences. Thus, the present scheme has an advantage of minimizing, if not completely eliminating, sample-to-sample contamination. With the sample securely encapsulated within a containing layer of immiscible oil, any potential sample-to-sample contaminant is from the carrier liquid (e.g., oil) itself.

Another benefit of oil encapsulation is that it prevents evaporation of precious aqueous samples trapped inside. Since the oil employed has a higher viscosity than water, the water core may lessen internal viscous friction and aid in droplet transport with less heating. In a typical LOC application, test samples are expensive, so evaporation is to be avoided, or at least minimized. An alternative embodiment employs the use of mineral oil to encapsulate the droplet. However, advantages of using silicone oils include safety (they are non-toxic and widely employed in cosmetics); their insensitivity to contamination; and their availability in a wide range of viscosities. The compound droplets need not be ingestable, but they preferably do no harm to the encapsulated biological sample.

Figure 5:
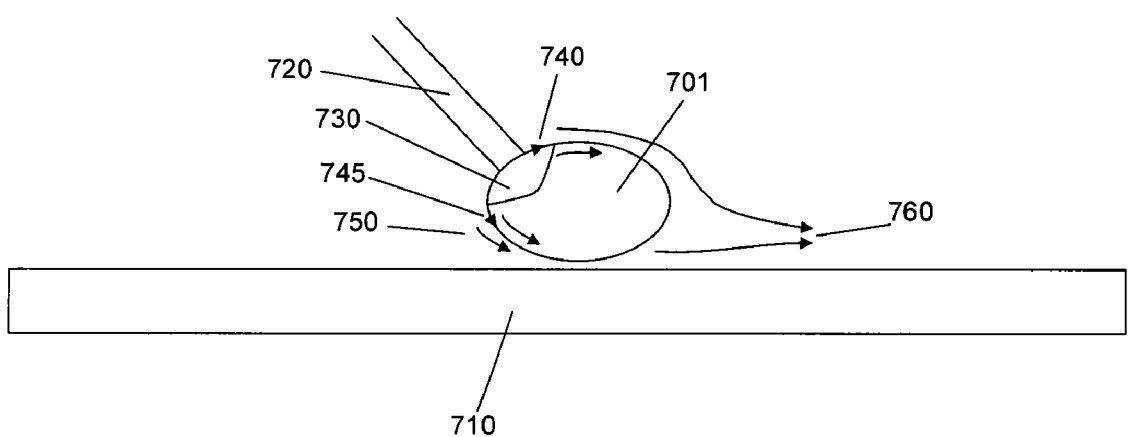
FIG. 5 is a side view of an exemplary embodiment of the levitation and movement of a droplet of the liquid of FIG. 1 above and along a surface using thermocapillary convection.

Encapsulation involves a method for producing aqueous droplets encased in an outer layer of immiscible oil. Given the small size of the aqueous samples, a technique is preferably employed that permits the volume of the encapsulating liquid to be small as well. Exemplary embodiments use a combination of coaxial injection with push-pull motion using independent piezoelectric actuators for the two liquids to permit the generation of single, small compound droplets of varying volume ratio. Other mechanisms may be used, It is possible to both levitate and move small oil (and compound) droplets. The motion on the surface of a droplet is driven through the application of localized heating. One embodiment employs infrared (IR) radiation, in combination with the phenomenon of thermocapillarity. Motion of the liquid free-surface gives rise to motion both within the bulk liquid and in the surrounding air. FIG. 5 shows a single droplet 701 levitated above relatively cooler plane 710. Heating source 720 has been directed off the axis perpendicular to plane 710. Thermocapillary convection on the surface of droplet 730 is indicated by arrows 740, 745. The surrounding air dragged by this surface motion is shown as 750, 760. The asymmetry of the air flow jetted from the surface of droplet 701 propels it in the direction of the heat source. This jetting of gas gives rise to reaction force 750 acting on droplet 701, propelling droplet 701 toward hot spot 730. Given the small volumes of droplets of interest in LOC applications, very little inertia is to be overcome to initiate droplet motion in this near-frictionless situation. Since the weight of a droplet of radius R scales as $R^3$ while each surface area scales as $R^2$, the ratio of surface forces to weight increases as $R^{-1}$ as R approaches zero. Assuming a Gaussian beam energy profile, as droplet 701 begins to move in a direction away from center, the energy becomes asymmetrically distributed on the surface of droplet 701, causing asymmetric heating. The resulting imbalance and surface tension due to thermocapillarity serves to center the droplet under the energy source using an IR heating method. Droplets of silicone oil may not only be levitated, but moved optically in this fashion. Droplet 701 follows the movement of beam 720. Other alternatives exist for reducing frictional forces to facilitate motion along surfaces such as aqueous solutions encapsulated with a hyrdophobic powder, allowing them to roll freely on surfaces; and the exploitation of surface roughness to create co-called superhydrophobic surfaces.

In the absence of a second bounding plane, an encapsulated droplet may be very difficult to control, since the droplet is levitated on a thin film of air, subject to very small frictional forces. For oil droplet 400 shown in FIG. 3, a slightly flattened region 460 is observable at the bottom of droplet 400. For an exemplary silicone oil, the capillary length that defines the competition between surface tension and gravitational forces may be approximately 1 millimeter, or the same as the droplet size. The pressure distribution within flattened lubrication region 460 permits droplet 400 to be levitated. For droplets of smaller diameter than the capillary length, the droplet shape is nearly spherical and a lubrication force may not be capable of wetting prevention, due to the small contact area. In this case, a single-plane geometry is insufficient to accomplish levitation and translation.

Figure 6:
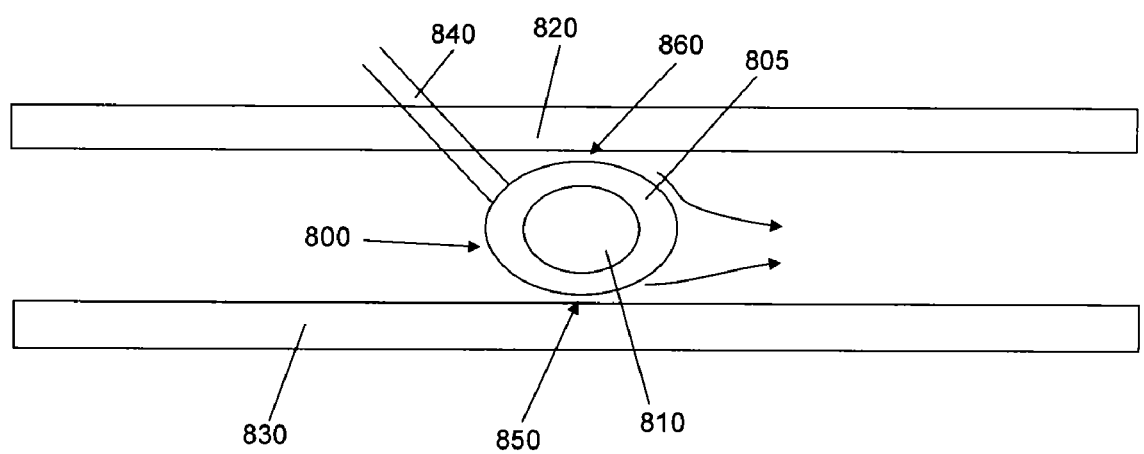
FIG. 6 is a side view of an exemplary embodiment of movement of a compound droplet of aqueous solution and the liquid of FIG. 1 between two parallel surfaces using thermocapillary convection.

The above-described challenges concerning small (with respect to the capillary length) droplets and a lack of friction to enable control of droplet translation may both be addressed through the employment of thermocapillary non-wetting. Referring to FIG. 6, thermocapillary non-wetting may be used in combination with droplet encapsulation to levitate encapsulated droplet 810 between planes 820, 830 that are sufficiently close to non-wetting droplet surfaces 850, 860, serving to flatten both surfaces 850, 860, and providing additional friction necessary for either levitation or position control. Nonwetting drops are capable of being squeezed significantly without loss of the lubricating air film. Once suspended between planes 820, 830, droplet 810 may be moved by directing heating source 840 to create the gas-flow asymmetry described above. The application of heating source 840 to one side of compound droplet 800 causes surrounding gas to be dragged into lubrication zones at flattened regions 850, 860 and jetted from the cold side of compound droplet 800 to provide the propulsive force necessary to accomplish droplet translation.

Encapsulation of the aqueous sample within inert, low volatility oil and the use of a second plane to provide a mechanism of applying additional frictional forces and cooling may be used to prevent the droplet from slipping in an uncontrolled fashion, and may be used to assist in the extraction of heat from the droplet. A pair of cold plates may be made from material, for example, sapphire, that transmits IR radiation to permit the exploitation of thermocapillarity. Other exemplary materials include diamond, among others. Exemplary embodiments of droplet transport systems and methods utilize oils such as silicone oils that 1) move easily under the action of localized heating and 2) have surface chemistry that permits the encapsulation of water droplets. The use of a pair of planes permits the droplet to be squeezed between a pair of air films increasing the apparent contact area and thus, the friction, along with providing an additional heat-sink to control droplet evaporation. A single-plane system provides no such mechanism for friction control, making droplet position control generally much more difficult.

The use of less volatile oils for encapsulation permits the use of IR radiation for droplet transport. Short transit times between end points in an LOC application should not result in undue evaporation. Given that the oil completely encapsulates an aqueous sample, the sample is completely isolated from contamination by preceding or subsequent samples that may follow the same path. Any evaporation and subsequent condensation of the encapsulating liquid on the channel wall will not adversely effect operation, since the same mechanism that leads to non-wetting has been shown to support non-coalescence between two bodies of the same liquid.

Compound droplets much smaller in size than the capillary length of the encapsulating oil may be suspended between planes 820, 830. Compound droplet 800 may be directed by the infrared radiation source 840 as droplet 800 passes from a droplet injector to the space between planes 820, 830. For droplet 800 generated at a temperature warmer than that of cooler planes 820, 830, injection without wetting may be possible. Solid surfaces coated with transparent metallic films may be employed to permit the surface to be electrically grounded to eliminate non-wetting failure due to electrostatic charges. Upper surface 820, may preferably be a material that is transparent to IR as well. Exemplary embodiments include diamond windows with metallic coatings, among others (e,g,. sapphire). In an alternative embodiment, IR source 840 may approach droplet 800 between planes 820, 830, rather than passing through either.

In addition to providing a lubrication force capable of suspending droplet 800, flattened regions 850, 860 also provide additional control over the frictional forces associated with the translation of droplet 800 to better control both position and speed of droplet 800 in a low-friction environment, particularly one which is not horizontally oriented. Positional control of droplet 800 may be achieved using closed-loop feedback control. Non-wetting droplets can sustain loads in excess of their own weight. The load may be determined from a static analysis of a deformed droplet by computing the increase in capillary pressure due to the change of curvature of the inner face from its undeformed shape.

Figure 7:
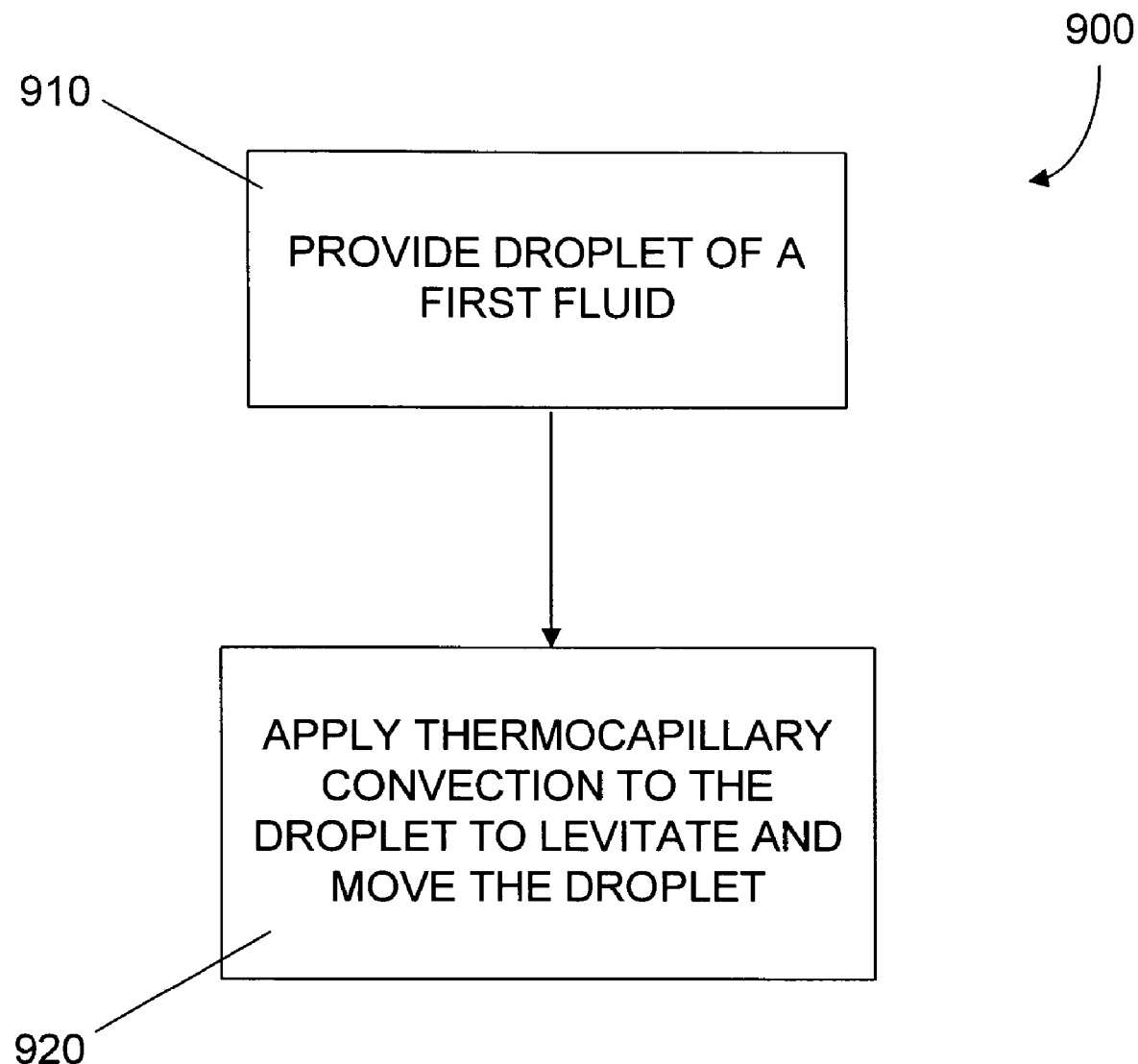
FIG. 7 is a flow diagram of an exemplary embodiment of a droplet transport method.

FIG. 7 provides a flow diagram for an exemplary embodiment of a droplet transport method 900. In block 910, a droplet of a first liquid is provided. In block 920, thermocapillary convection is applied to the droplet to levitate and move the droplet. In an application involving transport of a single liquid droplet, where contamination and evaporation are not primary issues, it may be preferable to omit the encapsulation step. In an alternative embodiment, however, where contamination and evaporation are primary concerns, the droplet of the first liquid may be encapsulated in a second liquid to form a compound droplet, and the heat source may be applied to the compound droplet.

Applications of LOC architectures invariably involve the combination and mixing of liquid samples. Droplet levitation and transport using non-wetting may enable this combination and mixing. Non-wetting as provided in FIG. 2B illustrates convective patterns that exist within a stationary non-coalescence system. Similar vigorous convection occurs within a translating levitated droplet. Mixing liquid samples is enhanced through the folding and stretching of phase fields. A combination of thermocapillary-induced stirring of a liquid combined with translation has proved to be effective in mixing the liquids.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method comprising: providing a droplet of a first liquid; and applying thermocapillary convection to the droplet to levitate and move the droplet.

2. The method of claim 1, further comprising encapsulating the droplet of a first liquid in a second liquid to form a compound droplet, and wherein the thermocapillary convection is applied to the compound droplet.

3. The method of claim 1, wherein the thermocapillary convection is applied between two planes.

4. The method of claim 3, wherein at least one of the two planes comprises material that transmits infrared radiation.

5. The method of claim 3, wherein at least one of the two planes comprises sapphire, diamond, or a combination of sapphire and diamond.

6. The method of claim 1, wherein applying thermocapillary convection comprises transmitting infrared radiation to the droplet.

7. The method of claim 1, wherein the first liquid comprises an aqueous solution.

8. The method of claim 2, wherein the second liquid comprises an oil.

9. The method of claim 8, wherein the oil comprises silicone oil, mineral oil, or a combination of mineral oil and silicone oil.

10. The method of claim 8, wherein the volatility of the oil is less than the volatility of the first liquid.

11. A system comprising: a droplet of a first liquid; and a heat source applied to the droplet for levitating and moving the droplet about a surface, wherein the heat source is configured to apply thermocapillary convection to at least a portion of the droplet.

12. The system of claim 11, further comprising a second liquid for encapsulating the droplet of a first fluid to form a compound droplet, wherein the heat source is applied to the compound droplet, the heat source further configured to apply thermocapillary convection to at least a portion of the compound droplet.

13. The system of claim 12, wherein the second liquid comprises an oil.

14. The system of claim 13, wherein the volatility of the oil is less than the volatility of the first liquid.

15. The system of claim 11, further comprising a first surface on which to steer the droplet.

16. The system of claim 15, further comprising a second surface below which the droplet is steered by the heat source.

17. The system of claim 16, wherein the first surface is substantially parallel to the second surface.

18. The system of claim 16, wherein the heat source is applied between the first and second surfaces.

19. The system of claim 16, wherein at least one of the first surface and the second surface comprises material that transmits infrared radiation.

20. The system of claim 16, wherein at least one of the first surface and the second surface comprises sapphire, diamond, or a combination of sapphire and diamond.

21. The system of claim 11, wherein the heat source is configured to apply thermocapillary convection to the droplet, the thermocapillary convection causing motion of the droplet surface, the motion of the droplet surface causing a surrounding gas to be dragged between the droplet and the surface.

22. The system of claim 11, wherein the first liquid comprises an aqueous solution.

\* \* \* \* \*